United States Patent [19]

Evans et al.

[11] Patent Number: 5,123,985

[45] Date of Patent: Jun. 23, 1992

[54] VACUUM BAGGING APPARATUS AND METHOD INCLUDING A THERMOPLASTIC ELASTOMER FILM VACUUM BAG

[76] Inventors: Patricia Evans; David Evans, both of 12 Lantern La., Chelmsford, Mass. 01824

[21] Appl. No.: 509,320

[22] Filed: Apr. 12, 1990

Related U.S. Application Data

[63] Continuation-in-part of Ser. No. 146,854, Jan. 22, 1988, abandoned, which is a continuation-in-part of Ser. No. 902,799, Sep. 2, 1986, abandoned.

[51] Int. Cl.⁵ .................. B32B 31/00; B32B 31/14; B29C 65/00
[52] U.S. Cl. .................. 156/213; 156/212; 156/285; 156/382; 156/475; 425/389
[58] Field of Search .............. 156/285, 286, 382, 212, 156/213, 475, 497; 264/313–316; 425/389; 428/147

[56] References Cited

U.S. PATENT DOCUMENTS 5,037,599 8/1991 Olson ..................... 264/316 X

OTHER PUBLICATIONS

Kirk–Othmer, *Concise Encyclopedia of Chemical Technology*: N.Y., John Wiley & Sons, 1985, p. 400.
Modern Plastics Encyclopedia 1977–1978, p. 114.

*Primary Examiner*—Michael W. Ball
*Assistant Examiner*—Adrienne Johnstone
*Attorney, Agent, or Firm*—Wolf, Greenfield & Sacks

[57] ABSTRACT

Thermoplastic elastomer film vacuum bags are provided which readily conform to the surface contour of the workpiece at low pressures without failure. The thermoplastic elastomer film can be made into thin films which are able to withstand higher pressures and temperatures than the prior art nylon films. The films can also withstand the presence of epoxide and phenolic resins during pressure and cure without degradation. Preferred thermoplastic elastomers are block copolymers such as Hytrel. The films are pliable and can be used with minimal or no pleating.

26 Claims, 7 Drawing Sheets

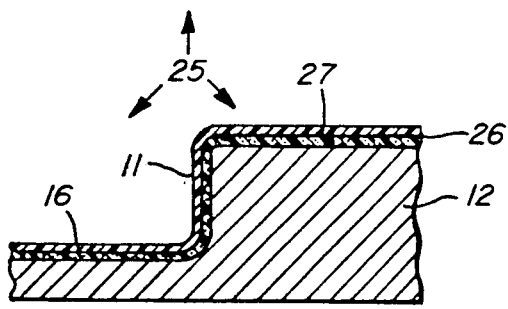 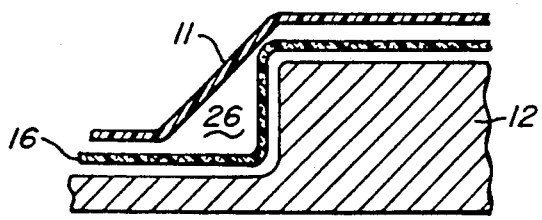
Fig. 1A    Fig. 1B
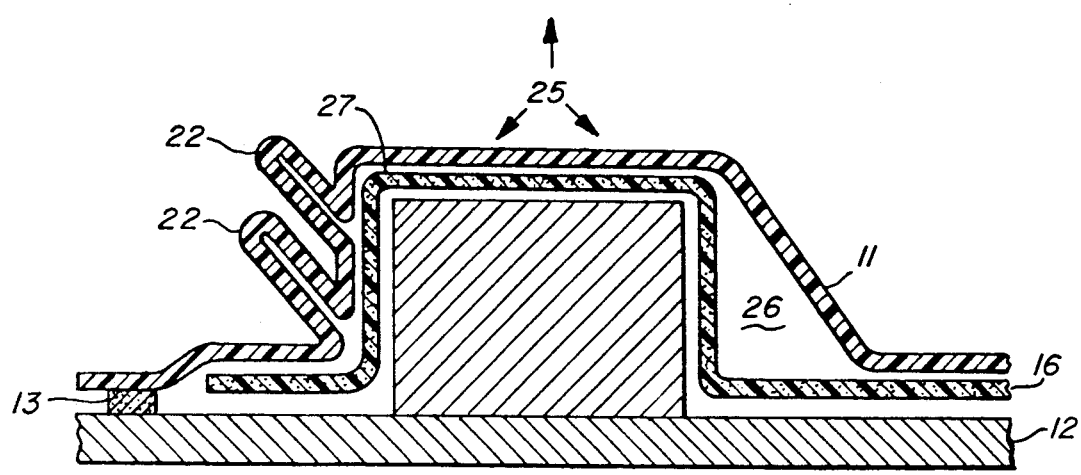
Fig. 2
(PRIOR ART)
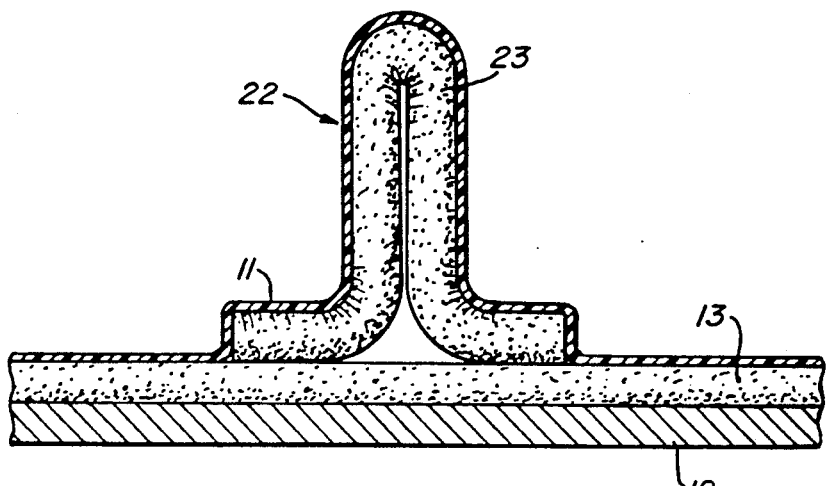
Fig. 4
(PRIOR ART)

VACUUM BAGGING APPARATUS AND METHOD INCLUDING A THERMOPLASTIC ELASTOMER FILM VACUUM BAG

This application is a continuation in part of U.S. patent application Ser. No. 07/146,854 filed Jan. 22, 1988, now abandoned which is a continuation-in-part of U.S. patent application Ser. No. 06/902,799 filed Sept. 2, 1986, now abandoned.

FIELD OF THE INVENTION

This invention concerns vacuum bagging apparatus and methods wherein pressure, or heat and pressure, are applied to a laminated workpiece to debulk or cure the same, and more particularly to the use of a thermoplastic elastomer film as a vacuum bagging membrane to provide improved performance at a lower cost than known vacuum bagging materials.

BACKGROUND OF THE INVENTION

Vacuum bags are used in the low-pressure molding of various plastic, rubber, and resin bonded products, such as reinforced plastics, laminates, and bonded sandwich structures. The bag provides a means of applying pressure to the workpiece to be debulked or cured. Typically the bag materials are degraded during the process by the combination of heat, pressure, corrosive adhesives, oxidative atmospheres, etc., such that the bag either cannot be reused or can only be used for a limited number of cycles Current practice in the manufacture o resin-bonded laminates for structural use is to pressure cure the product in the following steps:

1) A plurality of layers of resin impregnated fabrics or collimated tapes are applied to the surface of a tool to form a laminate. The layers or plies adhere to the tool and to each other by means of the tacky resin they contain. A typical resin is an epoxide composition.

2) A vacuum bag is positioned over the laminate and the perimeter of the bag is sealed to the tool. Air is drawn from the space between the vacuum bag and tool through a valve, built into the vacuum bag or tool, which is connected to a vacuum pump.

3) The tool, laminate and vacuum bag assembly is loaded into an oven or autoclave so that heat and pressure can be applied to effect consolidation and cure of the laminate. While the area between the tool and vacuum bag is maintained at reduced or atmospheric pressure, the pressure in the autoclave chamber is increased. The vacuum bag and tool are thus compressed together and the laminate between them is consolidated to produce a dense, strong article.

The vacuum bag approach provides a means of laminating and bonding at low pressures, i.e., 10 to 300 pounds per square inch. The system has many different uses and is able to accomodate workpieces of many shapes and sizes, limited only by the volume of the autoclave. In many cases, a single sided tool of modest construction, and hence cost, is all that is required. The tool only has to be impermeable and rigid at the process temperatures.

The prior art describes several different vacuum bags which act as a mobile pressure barrier, converting pneumatic or hydraulic pressure inside the autoclave to a mechanical pressure on the laminate. One basis for classifying different vacuum bags is whether they are intended for a single use or multiple uses.

A permanent bag is designed for multiple uses and is often an integral part of the tool. The permanent bags described in the prior art are based on elastomers which have high elongation and durability at the process temperature. U.S. Pat. No. 4,287,015 to Danner is typical, which describes a sheet of rubber which is attached and sealed to the tool and allowed to stretch over the laminate.

The permanent bags have had limited commercial success because of the short life of the materials used. The resin used during cure has a highly deleterious effect on many materials. For example, silicone rubber is one of the few elastomers capable of withstanding 350° F., but silicone elastomers are rapidly degraded in contact with epoxide resins. The tear strength of silicone, which is not high in the original material, is significantly reduced after contact with curing epoxides. Permanent bags are often put out of service because of nicks and tears in the elastomer membrane which can grow rapidly under stress. Also, while silicone and fluorocarbon elastomers have useful properties at high temperatures, their high cost coupled with insufficient use cycles very often cannot justify their use. For the majority of vacuum bag uses, disposable materials are the most cost effective.

Another problem with permanent rubber pressure bags is that sheet rubber of sufficient thickness to withstand handling and demolding will not stretch into a curvature of small radius on the workpiece at the low pressures used. Still further, the mechanical properties of elastomers are anisotropic and depend upon morphology. Hence, a permanent bag often has difficulty in successfully producing even pressure on a laminate with deep contours.

A typical single use vacuum bag of the prior art is constructed as follows:

A thin vacuum bag film is attached to the tool and sealed to it by sealant putty tape. A breather layer is disposed below the film for removing gas which permeates through the film in order to maintain the reduced pressure between the film and tool. Other components used in the vacuum bag include release layers to facilitate separation of the laminate from the tool and the other layers of the vacuum bag. Perforated release layers are used to restrict and control the flow of excess resin which is bled from the laminate. Bleeder layers accept this excess resin. Caul plates are used to provide equal pressure and thus equal consolidation over certain areas of the laminate. Peel plies are used next to the laminate, and are removed in subsequent operations to provide a fresh surface for bonding.

The film for a single use vacuum bag has to maintain its integrity during heating to the cure temperature and subsequent cooling and act as a pressure-transmitting diaphragm. Early films were made of cellulose, polyvinyl acetate, or polyvinyl alcohol. Nylon films have substantially replaced these early materials. The two basic types, nylon 6 (polycaproamide) and nylon 6—6 (polyhexamethylene adipamide) are each used because of their high crystalline melt temperatures, 428° F. for nylon 6 and 482° F. for nylon 6—6. A- heat. stabilizer is added to ensure retention of the physical properties during exposures at high temperatures and oxidative atmospheres.

Nylon films have limited elasticity and have to be applied with care to produce an effective vacuum bag. The film is tucked and folded into a pleated arrangement by the insertion of vertical "ears" in the sealing putty tape. The application is important to the function of the bag and is provided in sufficient quantities according to the skill and know how of the person making the vacuum bag. During cure, the laminate consolidates and moves closer to the tool. The nylon films have limited elastic behavior and if bridged across a female corner or concave feature, one of two results is possible. If the bridging is large the nylon film will be stretched beyond its elastic limit (yield point). Because of the low tear strength and frequent faults in the nylon film, the bag will burst and loose pressure integrity. Alternatively, if the bridging is small so that the film can sustain the pressure without yielding, the bridging can prevent pressure acting upon that area of the laminate. A laminate beneath the bridging is not consolidated and the individual plies are not held together by a continuous matrix of resin. Thus, bridging of the bag can lead to a low-strength part which is not acceptable for its intended use. In an attempt to prevent bridging, pleats are applied in the nylon film prior to the application of pressure. However, considerable skill and labor is required to properly place the pleats and in many cases some bridging results even with the application of pleats.

The value of the composite laminate may be several thousand times the value of the vacuum bag used to form it. In the case of a major aircraft composite frame structure to be formed by vacuum bagging, a very large value item may be in jeopardy from a vacuum bag which fails.

The low tear strength of nylon films is also a disadvantage when the film is being handled and folded to produce the desired configuration of the vacuum bag. Often, when a nylon vacuum bag is tested before use by reducing the pressure below the bag and listening for leaks by the ear or at ultrasonic frequencies, small leaks are found large number of these leaks are found at or near folds. These small leaks have the potential to grow during heating and pressurization, causing a sub standard molding.

The extensibility of nylon film is a function of the moisture content of the film. Moisture content of the film is in equilibrium with the relative humidity of the air surrounding it. During the winter season, the relatively low humidity of the air, which causes the nylon film to become regid and brittle, results in more frequent bag failures. Formulations to modify nylons have met with little success. Plasticizing the nylon film lowers its temperature endurance, while adding humectants only delays the onset of embrittlement. Products of this type are available (e.g., U.S. Pat. No. 3,738,949) but have not replaced unmodified nylon films.

It is an object of the present invention to provide a material for a vacuum bag which can withstand the application of heat and pressure without failing.

Another object of the invention is to provide a vacuum bag material which readily conforms to the shape of the workpiece so as to evenly consolidate the workpiece.

Yet another object is to provide a vacuum bag which requires limited or no pleating in use.

Still another object is to provide a vacuum bag which is not dependent upon the moisture content of the environment for flexibility.

A further object is to provide a vacuum bag which stretches at fairly low applied pressures, i.e., about 5 to about 100 psi.

A still further object is to provide a vacuum bag which can be handled without damage and which will stretch across sharp corners and female contours of the workpiece or tool without bridging or tearing.

Another object of the invention is to provide a vacuum bag which saves cost in the materials used and extends the range of pressures which can be used.

Yet another object is to provide a vacuum bag which can withstand a specific applied pressure at a lower film thickness than prior art bags.

Yet another object is to provide a vacuum bag which can be reused several times with a large savings in bagging costs.

A further object is to provide a vacuum bag which can be removed from putty tape sealant without damage.

A still further object is to provide a vacuum bag whose physical properties are not significantly affected by the presence of epoxide or phenolic resins.

SUMMARY OF THE INVENTION

The apparatus of this invention is a vacuum bag made of a thermoplastic elastomer film which can withstand the heat and pressure of vacuum bagging operations without failure (i.e., without puncture, tearing, or bursting). The thermoplastic elastomer may be any of several block copolymers or blends of polymers having hard and soft segments or domains in the polymer molecule or compound, and especially preferred are block copolymers of polyester/polyether such as Hytrel (Hytrel is a trademark of E. I. Dupont de Nemours and Co., Wilmington, Del.). The thermoplastic elastomers are extensible and will conform to the shape of the laminate during debulking and curing. The bag can be used with no or a reduced number of pleats without failure. The bag is not degraded by epoxy or phenolic resins and can withstand process temperatures of 350° F. and above.

BRIEF DESCRIPTION OF THE DRAWINGS

FIG. 1A is a partial sectional view of the vacuum bag film of this invention after yielding under pressure to conform to a female contour of the workpiece.

FIG. 1B is a partial sectional view of the film as in FIG. 1A but before the application of pressure.

FIG. 2 is a sectional view of a prior art bag applied to a workpiece showing pleating on the left side and bridging on the right side.

FIG. 4 is a side sectional view showing a normal means for providing a pleat by arrangement of the mastic putty sealant.

DETAILED DESCRIPTION OF THE PREFERRED EMBODIMENTS

Figure 3:
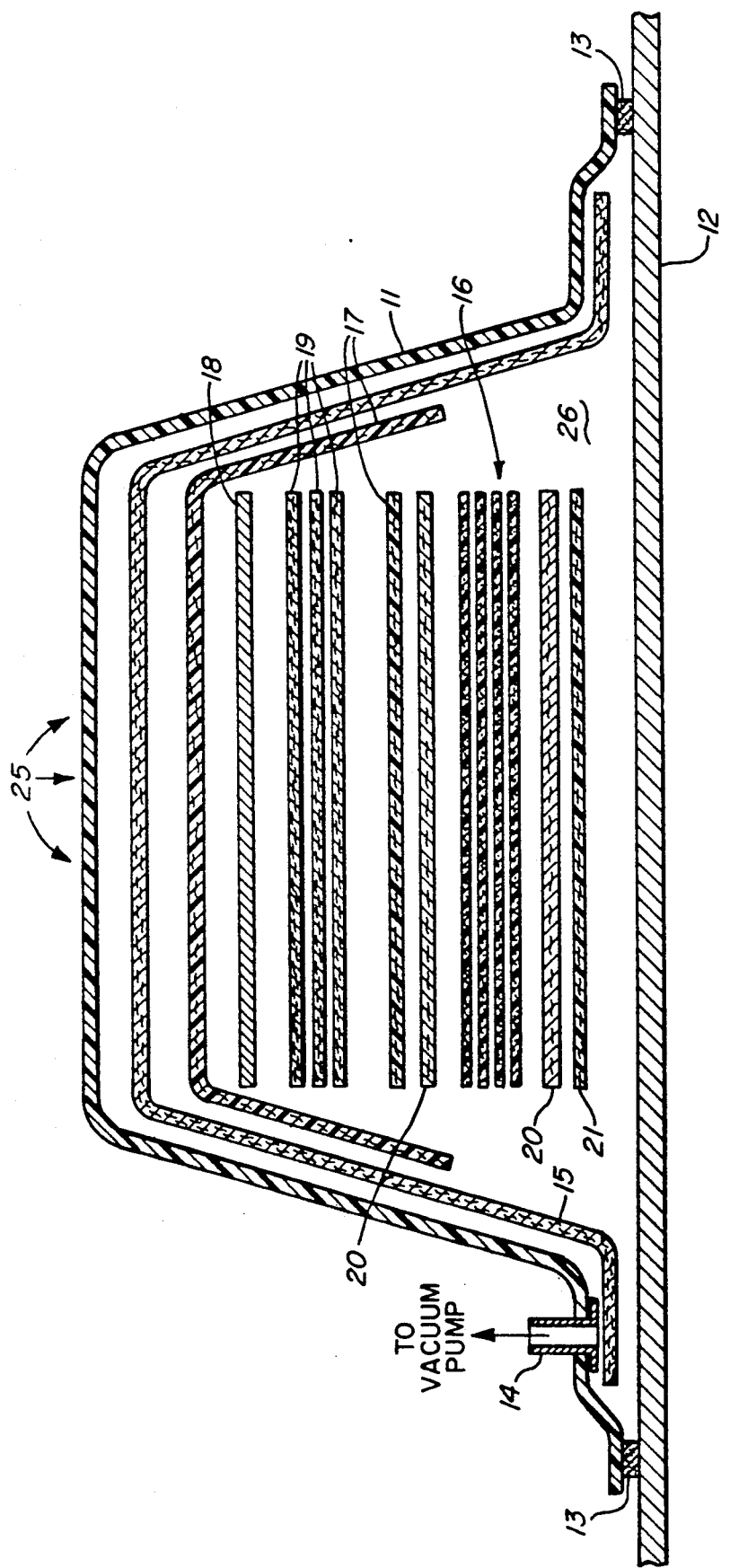
FIG. 3 is a side sectional view of a multi component vacuum bag and laminate applied to a mold.

A vacuum bag or pressure bag as in FIG. 3 is provided by means of a thin pliant film membrane 11 attached to a mold tool or base 12 with a tape of sealant putty 13. The area beneath the film 11 is evacuated of air through vacuum port 14 in film 11. The air is removed evenly and continuously from between the bag and the tool by a porous breather layer 15 to produce a volume of reduced pressure air 26. Air or other fluid pressure 25 is applied to the top side of the film 11 so as to consolidate or bring into close contact the laminate, adherends or composite 16 placed beneath the bag. The mechanical pressure is produced by the pressure differential between volumes 25 and 26 acting upon the film 11. Other components found beneath the bag are perforated release layers 17 to allow disassembly of the bag after cure, caul plate 18 which facilitates even application of pressure, bleeder layers 19 to absorb excess resin, peel plies 20 which are removed during subsequent bond preparation, and a release layer 21 next to the tool 12 to allow removal of the cured workpiece.

The thin malleable film membrane 11 is selected according to the following criteria:

a) The Vicat softening point as determined by ASTM D 1525 is at least equal to the laminate cure temperature.

b) The modulus of elasticity of the film is sufficiently low that, at the thicknesses and low pressures used, the film will stretch when placed in a bridged configuration (FIGS. 1A and 1B).

c) Tensile and tear strength are sufficiently high that the film will withstand normal handling.

The properties listed above can be found in the thermoplastic polymers known as thermoplastic elastomers. Thermoplasic elastomers are block copolymers or blends of different polymers having hard and soft segments or domains in the polymer molecule or compound. The soft regions provide the rubber like elastomeric properties while the hard regions act as mechanical crosslinks, tying down the rubbery sections. At processing temperatures the hard segments melt or soften to yield a molten plastic that can be easily processed by injection molding, extrusion, etc.

There are many different chemical types of thermoplastic elastomers, including block copolymers or blends of polyester, polyether, polyamide, polyurethane, polyolefin, polystyrene, polyacrylic, polyvinyl, polycarbonate, polyimide, polysiloxane, and mixtures thereof. These thermoplastic elastomers are formed by addition, condensation, or graft polymerization, chemical modification of polymers, or blending and compounding of polymers.

The preferred thermoplastic elastomers are block copolymers wherein the hard and soft regions are formed from blocks of two different polymer types. For example, a thermoplastic polyester/polyether is the result of an alternating block polymerization of a soft, amorphous rubbery polymer segment, polyether, with a hard glassy polymer segment, polyester, such as polyethylene terephthalate. Styrene/butadiene/styrene block copolymers have a similar structure, but due to the method of polymerization the center of the polymer chain is always the rubbery polybutadiene while the ends are glassy polystyrene.

Other thermoplastic elastomers are composed of different polymers which are compounded together. In these types there must be some compatibility between hard and soft domains to allow interaction between the two phases. Thermoplastic polyolefin elastomers, for example, are compounds based on blends of ethylene/propylene rubber with semicrystalline polypropylene.

The crystalline regions of the block copolymer determines the polymer melt temperature and provides structure so that the polymer exhibits elastic rather than viscous behavior. Block copolymers can have high melt temperatures, low modulus of elasticity, high tensile strength, and high tear strength—all of which are beneficial for use as vacuum bags.

The preferred polyester/polyether block elastomers offer a wide range of properties because of their broad flexibility/stiffness spectrum. In addition to the combination of strength and elasticity, polyester/polyether elastomers also offer exceptional dynamic performance, superior appearance, good creep resistance and excellent retention of properties over a broad temperature range.

Polyester/polyether polymers are elastic, but the recoverable elasticity is limited to low strains. In terms of "useful elasticity," their spring characteristic is a decade higher than most other plastics, but a decade lower than true rubber.

A distinguishing characteristic of polyester/polyether elastomers versus other flexible materials is their excellent dynamic properties. This makes them suitable for applications requiring long-term spring properties and flex life. Operating within their elastic range, these elastomers are very creep-resistant, withstanding high loads for long periods without stress relaxation. In addition, the dynamic responses are excellent. They can be subjected to repeated cycles of tension and compression without significant loss of mechanical strength.

Polyester/polyether elastomers are very easy to process, allowing considerable latitude in process conditions using standard plastic processing equipment. Films can be made by both extrusion casting and blowing. Like many other engineering polymers, these elastomers must be dried for processing.

The thermoplastic elastomer films of this invention preferably have:

a) a Vicat softening temperature (ASTM-D 1525) of at least about 350° F.;

b) a secant modulus of elasticity at 100% elongation of no greater than about 2500 psi (ASTM-D 882);

c) a thickness of from about 0.5 thousandths to about 10 thousandths of an inch;

d) a tensile strength of at least about 4000 psi (ASTM D 882);

e) a melting point of at least about 400° F.; and f) a tear strength of at least about 50 grams per thousands of an inch according to ASTM D 1922.

The preferred thermoplastic elastomer of this invention is a polyester/polyether block polymer sold under the trademark Hytrel by E. I. Dupont de Nemours and Co., Wilmington, Del. This material is a copolymer of two glycols polytetramethylene ether glycol and butene-1, 4-diol —and terephthalic acid. In Hytrel 55D, the crystalline polyester of butene-1, 4-diol and terephthalic acid is 58% by weight of the polymer. The polymer has a Vicat softening point according to ASTM D 1525 of about 350° F. and a crystalline melt temperature of about 412° F. The polymer has a secant modulus of elasticity at 100% elongation of about 2400 psi in tension.

The Hytrel elastomer is formed as a film by hot extrusion or cold solution casting. Films cast from solution do not normally produce films of constant thickness. Large thickness variations are detrimental in a vacuum bag because of uneven stretching behaviour. Hot extrusion of the film is by two processes known as bubble blowing and chilled roll casting. Chilled roll casting is easier for low melt viscosity materials like Hytrel because the melt exits a slot die and immediately meets a chilled roll. Chilled roll casting, however, is more expensive and it is difficult to produce films below 10 thousandths of an inch by this process. Bubble blowing produces a thinner film at a faster rate than chilled roll casting and is the preferred process for this invention. Both extrusion processes are well described in the literature, e.g., Plastics Engineering Handbook, Joel Frados, Copyright 1976, Society of the Plastics Industry, pages 174-182, Van Nostrand Reinhold Company, New York, N.Y.

The preferred elastomer is melted according to the manufacturer's instructions, e.g., for Hytrel the instructions are in "Blown Film of Hytrel Polyester Elastomer," Hyt-452 (R1), 1985, E. I. Dupont de Nemours and Co., and in "Extrusion of Hytrel," Hyt-403 (R1), 1985, E. I. Dupont de Nemours and Co. It is forced through a rotating die with a 5 to 20 thousandths inch gap and air pressure is applied in the bubble to draw the film down to the desired thickness.

A vacuum bag constructed from Hytrel 55D at 2/1000 to 5/1000 of an inch in thickness meets the requirements of a more reliable vacuum bag at pressures from 5 to 150 pounds per square inch (psi). It is suitable for curing structural laminates or bonded structures at 350° F. One of the surprising aspects of this invention is that Hytrel 55D has a melting point lower than that of nylon (412° F. for Hytrel 55D as compared to 428° F. for nylon), and yet the Hytrel 55D film is suitable for curing at 350° F. A significant benefit of the Hytrel 55D film of this invention is that it can withstand cures at 350° F. in the presence of phenolic resin without failure. In contrast, nylon is degraded by the presence of phenolic resins.

Variance of the polyester/polyether composition can be used to vary the film properties to suit particular cure cycles. For example, at 350° F. a polyester/polyether film degrades in less than one hour at normal atmospheric conditions. One percent of an aromatic amine (Naugard 445 from Uniroyal Inc., New York, N.Y.) is an effective heat stabilizer and antioxidant which increases the life of the film at 350° F. up to at least ten hours. Hytrel 5555 HS is a heat-stabilized version of the standard grade of the polymer (5556) containing a mixture of antioxidants which also survived at least 10 hours at 350° F.

Higher pressures and temperatures can also be accomodated by bags of thicker films of polyester elastomers. A thick film of the polyester/polyether polymer, for example 10/1000 of an inch, is sufficiently pliable to fabricate successful bags. Although some pleating may be required, increased toughness and compliance allows pressures (100 to 500 psi) to be born which are outside the range of nylon films. The thermoplastic polyester elastomers of crystalline content above 58% can also be used in higher pressure and higher temperature cures. These polymers (Hytrel 63D) are not as rubber-like as others (Hytrel 40D), but are still considerably softer than the polymers used in the prior art. The hardest grade of Hytrel, Hytrel 72D, has a modulus of at least half that of nylon 6—6, and has a Vicat softening point according to ASTM D 1525 of 397° F.

The lamination of heavy structures from graphite fiber, aramid fiber, or glass fiber requires intermediate consolidation to avoid excessive movement during the final cure. Such consolidation or debulking is best carried out with a vacuum bag constructed of film of about .5/1000 to 3/1000 of an inch in thickness, extruded from a polyurethane thermoplastic elastomer.

Thermoplastic polyurethanes are block copolymers with alternating hard and soft domains or phases. They are bridgable structures formulated by condensation polymerization. Many other materials can be added to either side of the polyurethane bridge—the backbone of the material, and result in a greater variety of properties. Thermoplastic polyurethanes fall chiefly into two categories—esters and ethers. The esters are generally the tougher of the two but will hydrolize and degrade when soaked in water. Ethers do not hydrolize or biodegrade even on prolonged exposure.

Figure 6:
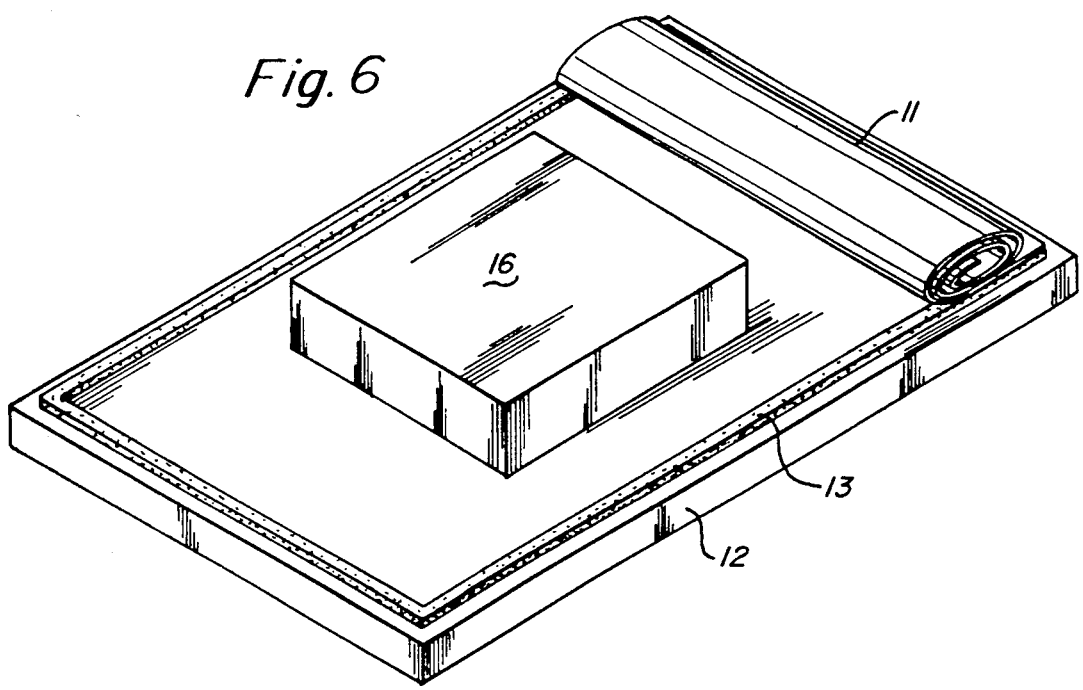
FIG. 6 is a top perspective view of the vacuum bag of the invention being used for debulking.

As shown in FIGS. 6, debulking is best carried out with a vacuum bag constructed of film 11 at about 0.5/1000 to 3/1000 of an inch in thickness, extruded from a polyurethane thermoplastic elastomer. Such a bag has a tear strength of at least 350 pounds per linear inch according to ASTM D 624 and a modulus of about 1000 pounds per square inch at 100% elongation. It can be removed from the tape of sealant putty 13 attaching it to the tool 12 by careful peeling. Sealant tape 13 may be any of several commercially available butyl-rubber based tapes such as Tacky Tape Vacuum Bag Sealants sold by Schnee Morehead, Inc., Irving, Tx. Multiple uses of one preconsolidation bag is thus possible. Debulking and preconsolidation of the laminate 16 is also simpler as the bag has very few or no pleats and tucks for single sided constructions. Some debulking cycles require heat and pressure. The bagging for these is best achieved with the previously described polyester/polyether thermoplastic elastomers.

In the operation of the invention, a vacuum bag is constructed as in FIG. 3 with the film membrane 11 which is fabricated from a thermoplastic elastomer as previously described. A single layer of sealant putty tape 13 is used. Unless a contour change is severe, no tucks or pleats are required. Before applying a pressure differential across the bag, parts of the membrane 11 will be stretched across features as in FIG. 1b. As soon as pressure differential 25-26 is applied the film stretches and conforms to a top surface 27 of composite 16 beneath it, as in FIG. 1A. No bridging occurs because the film stretches until it is in contact with surface 27. Sharp features are also conformed around so that a puncture is unlikely.

Figure 5A:
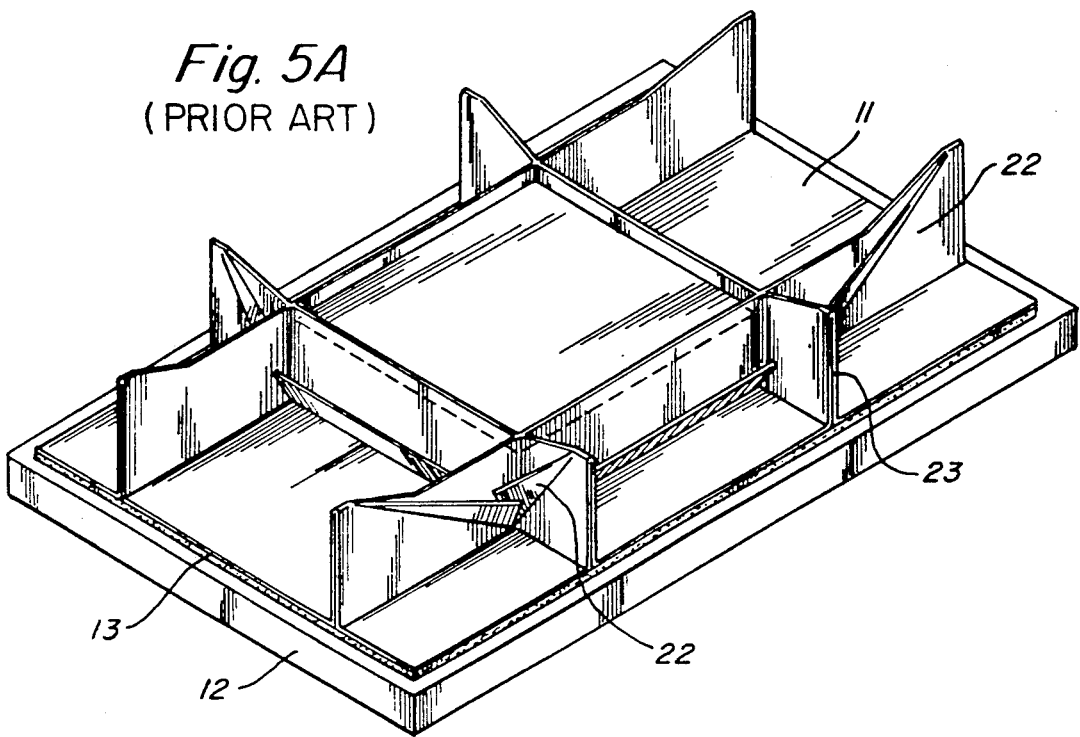
FIG. 5A is a top perspective view showing a pleating arrangement, for a prior art bag.
Figure 5B:
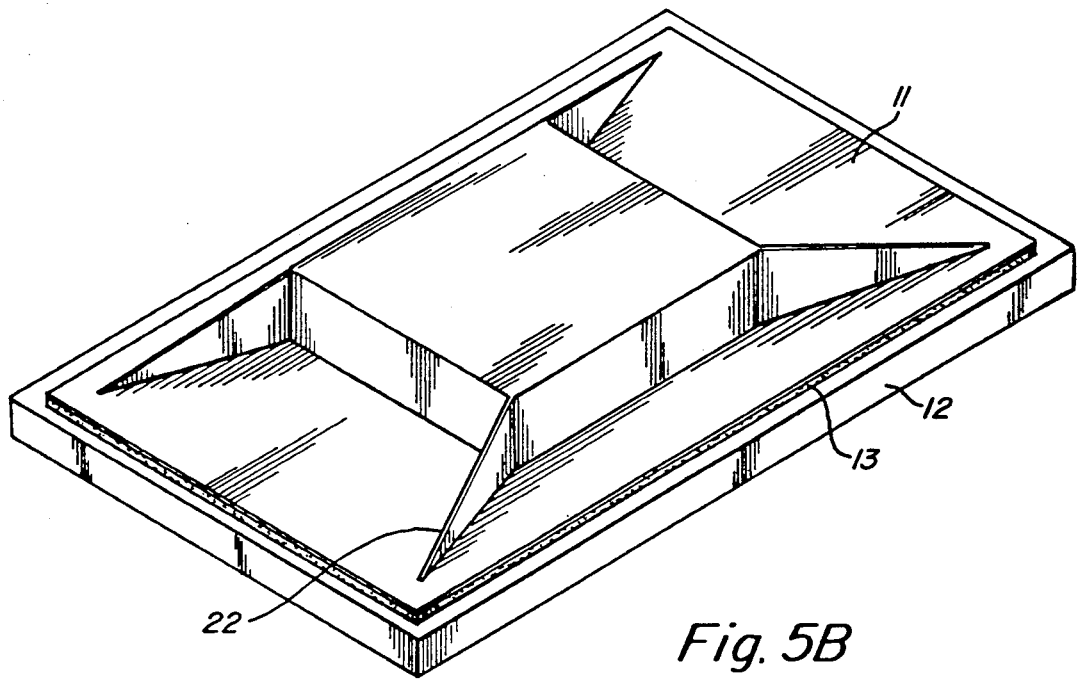
FIG. 5B is a top perspective view showing the bag of this invention which is conformed under pressure to contact all parts of the workpiece.

Mold tools or bases 12 with severe contour are bagged with pleats 22 only to allow the comfortable placement of the film on the sealant tape 13 by the operator without undue force and without creating enough lateral tension in the film 11 to disbond it from the sealant tape 13. The bag, as it conforms to the surface 27 beneath it, will produce some pleating (see FIG. 5B). However, this is much less than the laboriously applied pleating 22 and 23 of the prior art, as shown in FIG. 5A.

When the bag is used for vacuum debulking, the film 11 is detached and rolled back to allow the next lay up stage to proceed (FIG. 6). When the next increment of laminate 16 is applied, the film 11 is reattached to the sealant putty tape 13.

The styrenic block copolymers, also useful in this invention, have a distinctive block molecular structure which can be precisely controlled and tailored for a variety of properties. Styrenic thermoplastic elastomers have a combination of high-strength and low viscosity. Styrenic block copolymers are described molecularly by the general formula $(S-E)_nX$, where S represents a polystyrene end segment, E represents an elastomer mid segment (usually either polybutadiene, polyisoprene, ethylene butylene, or ethylene propylene rubber) and X represents a junction point. Styrene/ethylene-butylene or styrene/ethylene propylene block copolymers have good resistance to heat.

The following example illustrates the reduction in pleating achieved by the film of this invention, which results in a considerable savings in labor.

An aircraft nose wheel or undercarriage door 12 inches by 7 feet and ⅜ inch thick was prepared for vacuum bagging with a prior art nylon bag and with a Hytrel 55D bag of this invention. The door was made of aluminum sheet, aluminum honeycomb and epoxide adhesive film, and had 3/16 inch metal reinforcing strips on its top surface. The mold was 8 feet by 18 inches. Both the mold and door were concave in the short dimension and curved to a depth of ½ inch at the center. A sealant tape ½ inch wide and ⅛ inch thick of a butyl rubber compound was provided around the perimeter of the mold with 6 inch vertical ears of putty for the pleats provided with the nylon film.

The bagging operation was conducted at room temperature. The tacky sealant tape was applied around the edge of the tool. The vacuum bag was placed over the workpiece and with the nylon bag, ears were formed. With the Hytrel bag, the film was slightly stretched (about 10%) and attached to the sealant tape. A 25 inch Hg vacuum was pulled.

The nylon film was 10 feet by 2 feet and 3/1000 inch in thickness. Twelve ears were required around the edge, two on each end and four on each side. These pleats were formed by hand. It took 30 to 35 minutes to prepare the bag.

In contrast, the Hytrel film bag was prepared in only ten minutes. No ears were required. The film was 20 percent smaller in size than the nylon bag and of the same thickness, 3/1000 inch. The smaller size represents a savings in material costs. The Hytrel film readily conformed to the workpiece under pressure.

Another example illustrates the savings in materials which are possible when the vacuum bag of the invention is used for debulking or compacting thick composite laminates during their construction.

A large fuel tank for a helicopter was constructed from carbon fiber cloth preimpregnated with epoxide resin. The walls, floor and roof of the tank were constructed separately by laying down layers of the cloth and cold compacting the layers. The separate pieces were then brought together in one large mold and co cured to produce the tank.

The individual walls of the tank were approximately 6 feet by 6 feet and up to 0.75 inches thick. The lay up required debulking for each 5 layers of fabric applied. A nylon film vacuum bag was previously used for each of these compaction/debulking cycles. The bag was constructed with butyl rubber sealant and pleats in the same manner as the previously described example for prior art vacuum bags. Because of the low tear strength and durability of nylon film, the vacuum bag could not be removed from the mold tool in one piece even though it was 3/1000 inch thick. A new nylon bag was required for each of the debulking cycles.

The debulking was carried out with a vacuum bag constructed from 1.25/1000 of an inch polyurethane film with previously described properties. This film was attached to the sealant by stretching it (about 10–25%) over the layers of cloth and attaching it to the tacky sealant putty. The film conformed to the laminate and tool when vacuum (20–25 inches Hg.) was applied. After 15 to 30 minutes the plies of fabric were compacted together. The polyurethane film was peeled back and successfully removed from the putty sealant. Another five layers of fabric were applied to the laminate and debulked using the same piece of polyurethane film for the vacuum bag. It was found that the film could be used for all of the six debulking cycles required. The vacuum bag of the invention was thus one piece of film 1.25/1000 of an inch thick, whereas the prior art used six pieces of nylon film 3/1000 of an inch in thickness. A considerable savings in materials was shown by this invention.

Figure 7:
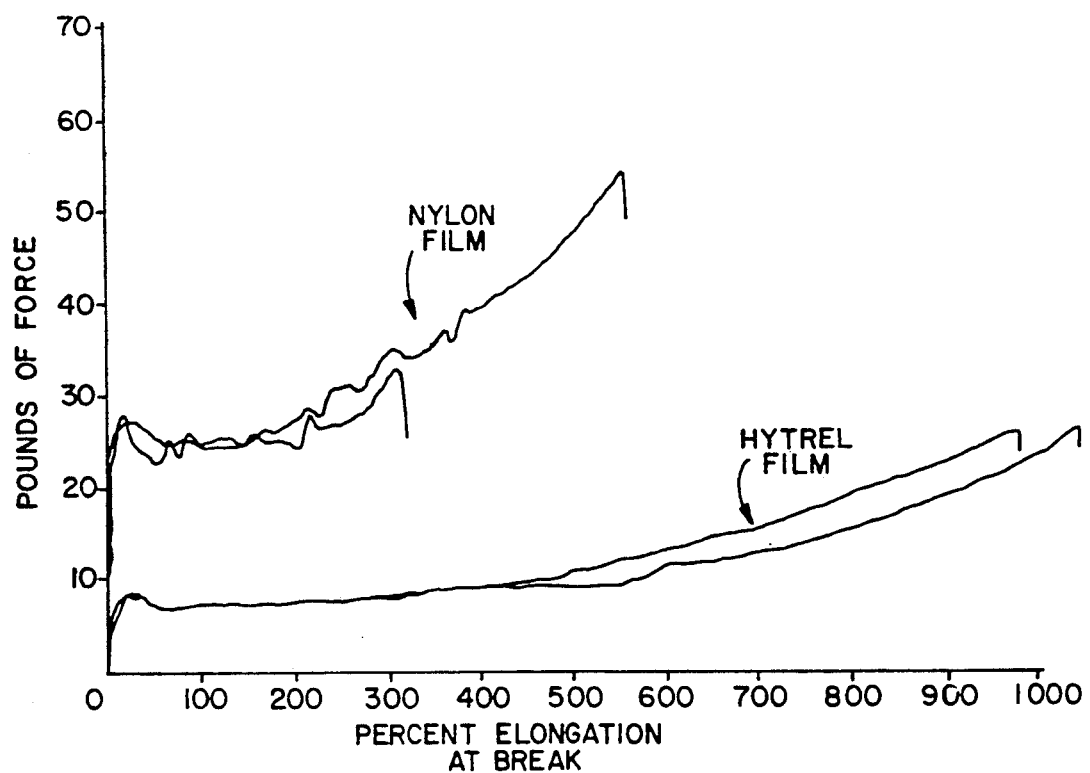
FIG. 7 is a graph of percent elongation at break (strain) along the abscissa and pounds of applied force (stress) along the ordinate comparing the vacuum bag of this invention with the prior art nylon bags.

FIG. 7 is a graph comparing the percent elongation at break along the abscissa and pounds of force along the ordinate for two prior art nylon 6--6 films and two Hytrel 55D films of this invention. The test was conducted according to ASTM D 882. The gauge length was 2 inches, so that a two inch elongation represents 100 percent elongation. Along the abscissa, one division represents 100 percent elongation. Along the ordinate, one division represents 10 pounds of force as read by the test machine. The Hytrel film of this invention, which was a blown bubble film, was tested in both the transverse and longitudinal directions to determine whether the molecular orientation of the blown bubble processing had any effect on the elongation. There was no noticeable effect. As shown in FIG. 7, the nylon 6—6 film stretched 300 and 550 percent and failed at 33 pounds and 54 pounds respectively. In contrast, the Hytrel film stretched 920 and 1080 percent and failed at 27 pounds and 28 pounds respectively.

The stress-strain behaviour of nylon film is typical of rigid thermoplastics and an improved vacuum bag durability can be achieved only if a high tensile strength bag material is used. By contrast, in the vacuum bag of this invention, tensile strength is relatively unimportant, whereas the ability to stretch considerably at low stress is important. The difference in stress behavior is illustrated by these curves.

Figure 8:
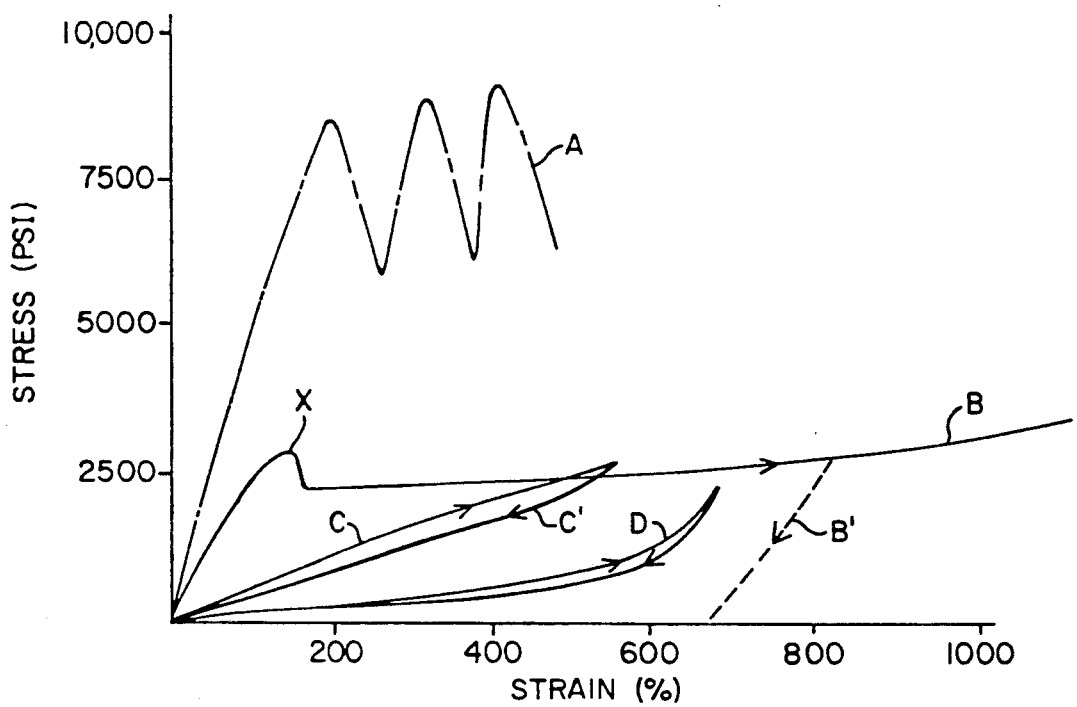
FIG. 8 is a graph of strain (%) along the abscissa and stress (psi) along the ordinate comparing the vacuum bags of this invention with the prior art nylon and silicone rubber bags.

FIG. 8 compares the elongation behavior of a prior art nylon bag (curve A), a prior art silicone rubber bag (curve D), and two vacuum bags of this invention, one preferred for use during final cure of the laminate (curve B) and the other for use during debulking (curve C). The prior art nylon bag (curve A) has a relatively high modulus of elasticity at 100% elongation and beginning at about 200% elongation exhibits erratic yielding behavior and only limited elongation. The lowest modulus of elasticity at 100% elongation which can generally be expected from a nylon film vacuum bag, even at a high moisture content, is about 5000 psi. In contrast, the preferred vacuum bag of this invention for final curing (curve B) shows a relatively low modulus at 100% elongation (about 2400 psi) enabling the bag to stretch to conform to the workpiece at relatively low pressure differentials. Below the yield stress at point X (about 2600 psi of stretch and 150% elongation), the bag exhibits an elastic stretch which produces no permanent deformation upon removal of the pressure differential. After reaching the yield stress the bag exhibits a smooth and extended yielding behavior at substantially the yield stress up to and beyond 1000% elongation. This enables the bag to yield across major contour changes of the laminate in order to conform thereto. After yielding, the film returns to a new longer length, such as shown by curve B'. It is important to this invention that even after yielding, the film stretches elastically at substantially the yield stress so as to remain in contact with a shrinking/compacting workpiece. In contrast, the prior art silicone bag (curve D) stretches elastically, but does not yield, and as it approaches the break point requires increased stress to attempt to remain in contact with a compacting workpiece.

Figure 9:
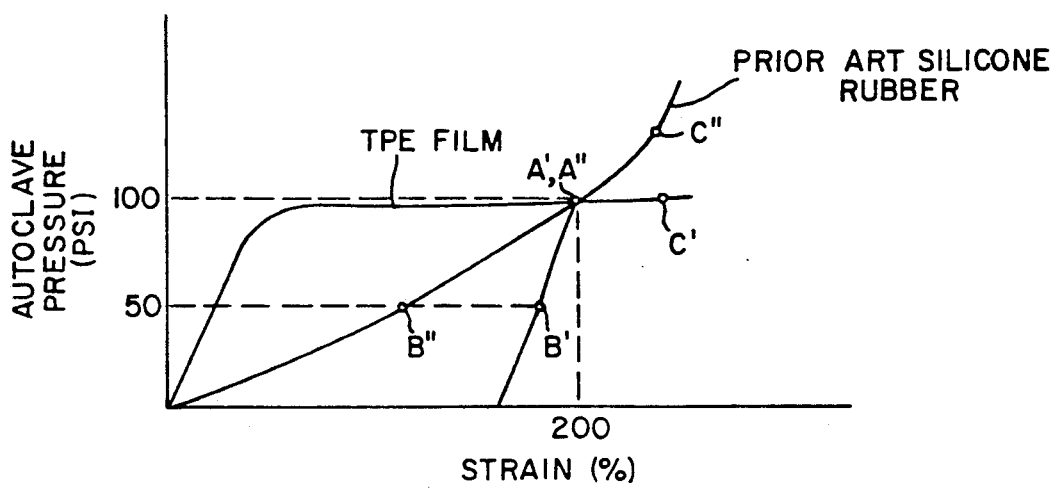
FIG. 9 is a graph of strain (%) along the abscissa and autoclave pressure on the bag along the ordinate comparing the thermoplastic elastomer film of this invention with the prior art silicone rubber bag.
Figure 10A:
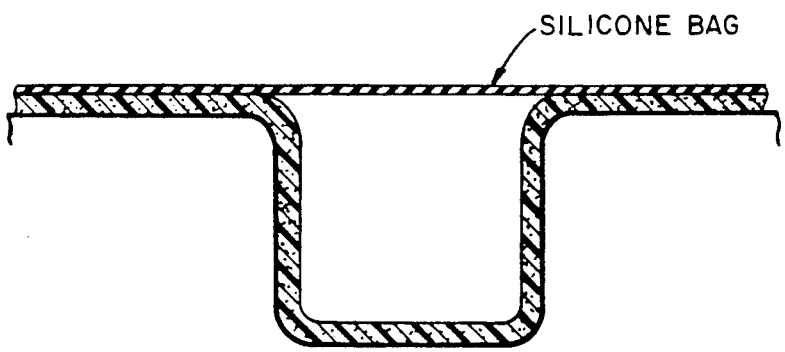
FIGS. 10a–10d illustrate the stretching of the prior art silicone rubber bag at various stress levels.
Figure 10B:
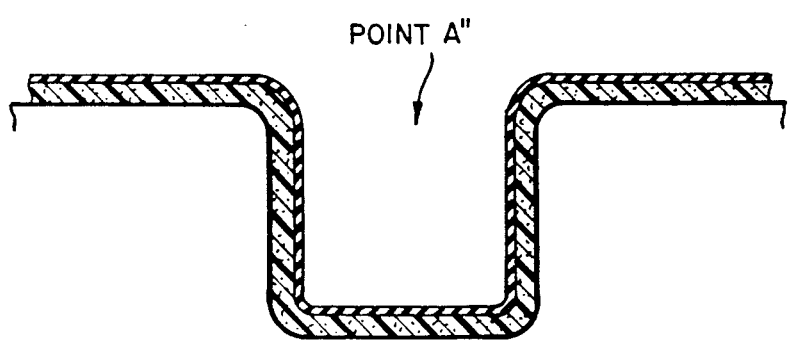
Figure 10C:
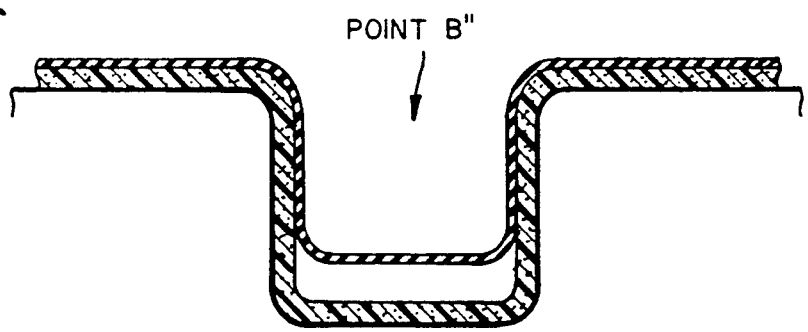
Figure 10D:
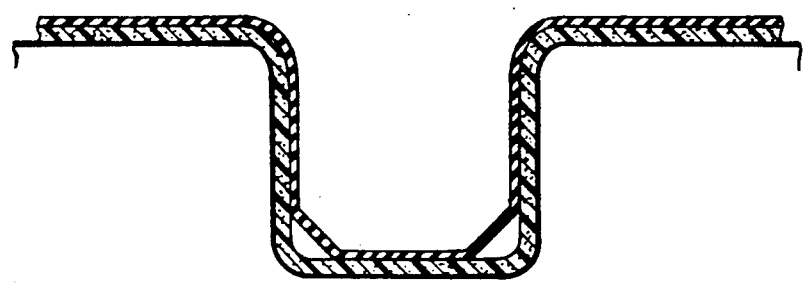
Figure 11A:
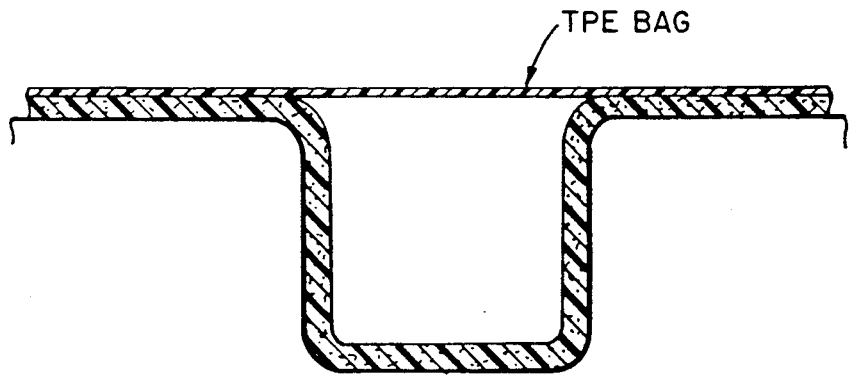
FIGS. 11a–11d illustrate the stretching of the thermoplastic elastomer film of this invention at various stress levels.
Figure 11B:
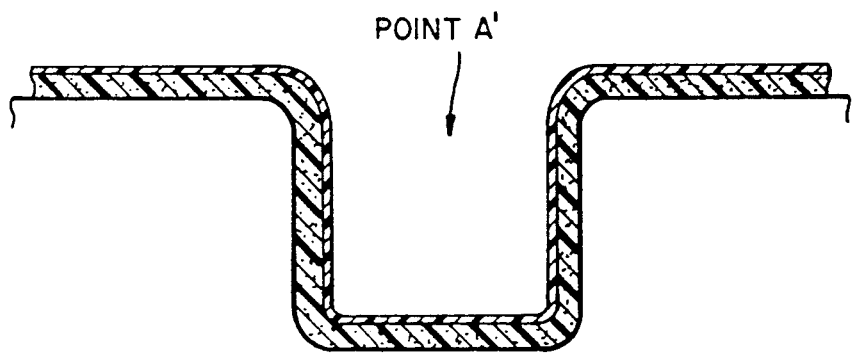
Figure 11C:
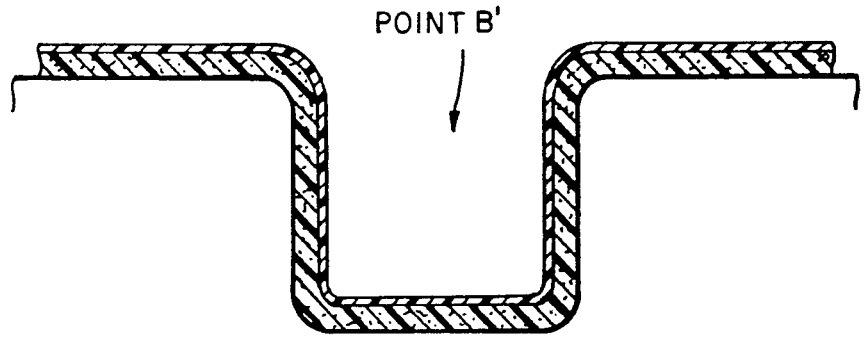
Figure 11D:
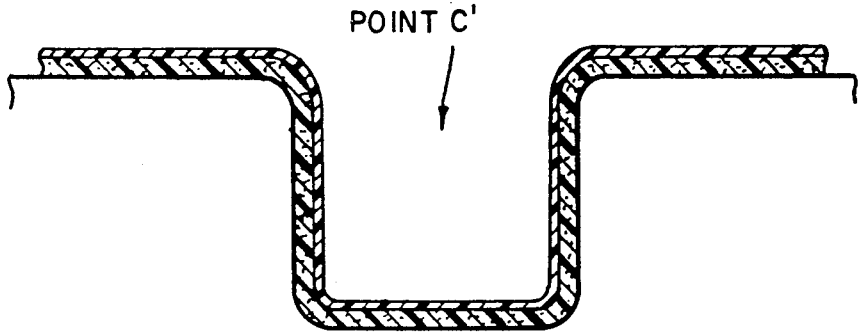

FIGS. 9-11 further illustrate the difference between the thermoplastic elastomer (TPE) film of this invention and the prior art silicone rubber bag. A silicone bag and a TPE bag are each layed over a re entrant feature of the workpiece, as shown in FIGS. 10a and 11a. With the application of 100 psi, both bags are pulled down into the re-entrant in contact with the workpiece (FIGS. 10b and 11b and points A" and A' in FIG. 9) If the pressure is reduced to 50 psi, the silicone bag pulls away from the workpiece (FIG. 10c, point B" in FIG. 9). However, the TPE bag is permanently deformed to the shape of the feature and the loss of pressure does not result in a loss of contact (FIG. 11c and point B' in FIG. 9). As the workpiece compacts, the bag will need to further extend to remain in contact with the workpiece. The silicone bag requires extra pressure in order to extend and follow the contracting workpiece. At 100 psi the silicone bag does not extend sufficiently, but bridges across the lower corners of the re-entrant (FIG. 10d, point A" in FIG. 9). Extra pressure is required to extend the bag to follow the compacting workpiece (point C" in FIG. 9). However, this pushes the silicone bag close to its breaking point. In contrast, the TPE bag will conform to the compacting workpiece with no additional force (at 100 psi)(FIG. 12d and point C' in FIG. 9).

For debulking, the film exhibiting the behavior of curve C is preferred. The film is substantially elastic over an extended range up to about 500% elongation. It exhibits a very low modulus at 100% elongation (about 1000-1400 psi) which enables it to stretch at the relatively low pressures involved in debulking. After removal of the pressure differential, the bag returns to substantially the same length as it started to enable repeated use.

A preferred polyester/polyether block copolymer for curing cycles up to about 350° F. is now described. The film was made from a mixture of polymers available from E.I. Dupont de Nemours and Co., Wilmington, Del. A mixture of 70 parts Hytrel 5556, 25 parts of HT G 4275 (or HT-R 4275), and 5 parts of Hytrel elastomer 30 HS, were fed into the hopper of an extruder and blended. Hytrel 5556 is comparable to Hytrel 55D previously described,, having a Shore D hardness of 55 according to ASTM D2246, a Vicat softening point according to ASTM D1525 of about 350° F., a crystalline melt temperature of about 412° F., and a secant modulus of elasticity at 100% elongation of about 2400 psi according to ASTM D882. Hytrel 5556 has a relatively high melt flow index which makes it more difficult to produce a stable blown film. For this reason HT-G-4275 is added, a modified Hytrel resin having a low melt flow index to increase the viscosity and melt strength. Hytrel 30-HS is a heat stabilizer and antioxidant which increases the life of the film at 350° F. up to at least 10 hours; it is described in U.S. Pat. No. 3,896,078. In addition, two parts of an anti-blocking compound, CEPS002413, sold by Reed Plastics, Holden, Mass., is added to 100 parts of the mix described above. Anti blocking compounds, comprising a clay or mineral powder, have been used in the art to matte the surface of a film to prevent adhesion of the film layers when wrapped into a roll. Anti blocking compounds are preferred over internal lubricants which are chemically bound to the thermoplastic, because internal lubricants can migrate out of the film into the laminate.

The materials are dried to remove any moisture and preferably a hopper with a dry air or heated air feed is used to keep the mix dry while it is in the hopper. The polymer mix is extruded at between 400° and 405° F. in the extruder barrel with a die temperature close to the melt temperature of about 410° F. The melt is forced through a circular die attached to the extruder and blown to produce a film thickness of three thousandths of an inch. This is an economical thickness for a film that remains resistant to tearing and has low permeation. The film will further stretch 400-500% in use with a corresponding loss of thickness. The film may be blown at thicknesses below three thousandths of an inch if desired for greater conformability to highly-contoured workpieces at lower applied pressure.

For additional heat resistance, Hytrel 7246 may be in place of Hytrel 5556. In this case the film is produced with an extruder temperature about 10°-30° F. higher. The elongation of this film is more limited, which makes it safe to use below three thousandths of an inch, but less able to conform to a highly contoured workpiece.

For curing up to 400° F., a preferred polyester/polyester block copolymer is used, such as UM grade 550 sold by Akzo Plastics By of Arnhem, Netherlands. The polyester/polyester block copolymer is inherently more stable to oxidative degradation and has a lower melt flow index than the polyester/polyether block copolymers.

Blown film is preferred because it is economical and can provide a uniform thickness and larger film width. However, cast film may be made by the chill roll process wherein the polymer is melted in an extruder and fed into a flat die, the lip of the die and flow of the melt being adjusted to produce a thin film. The film is set immediately onto a chilled roll to solidify it. This process does not require a high melt strength and film can be produced without the viscosity modifiers of the previous embodiment. The chill roll can be embossed to matte the surface of the film.

For curing polyimide or thermoplastic matrix (e.g., polyether ether ketone) composites at temperatures of 600°-700° F., a polyimide/siloxane block copolymer is preferred Copolymers such as those described by Arnol, J. D. Summers, R. H. Bott, L. T. Taylor, T and J. E. Mcgrath, "Structure Property Behavior Of Polyimide And Siloxane Segmented Copolymers," 32nd International SAMPE Symposium, Apr. 6-9, 1987, pages 586-596; Lee, C. J., Novel Soluble Silicone Imide Copolymers, 32nd International SAMPE Symposium, Apr. 6-9, 1987, pages 576-585, have a range of properties which can be tailored to meet the end use. The siloxane block confers flexibilty, but lowers the glass transition temperature and ultimate stability. The film can be produced by casting from solution. Alternatively, film can be produced by melt processing, particularly those copolymers having the higher siloxane content.

Debulking is required because as a composite part is laid up, air is trapped between the plies. Debulking is used to draw out this air and bring the laminate closer to its final dimensions. Debulking eliminates excessive movement in the laminate during cure, as well as assuring that no air will remain in the laminate (which produces low-strength voids). A compaction cycle of 10-60 minutes with a vacuum beneath the bag is typical. A debulking cycle is often needed for each five plies that are added to the workpiece. In a component with hundreds of plies, this requires many cycles.

The preferred debulking bag of this invention can be removed from the sealant putty between cycles without damage and is thus reusable. This results in a substantial economic savings. In use, the bag is adhered to a layer of sealant around the periphery of a mold tool. The bag must stretch at a relatively low pressure, typically no more than about 10 pounds per square inch. The pressure differential is produced by drawing a vacuum beneath the film and applying atmospheric pressure above the film. After a debulking cycle the film is removed from the sealant on three sides and rolled back on a fourth side. More plies are added to the laminate and the film is adhered again to the sealant for another debulk. The bag is used for each debulking cycle until the workpiece is ready for cure. Economic savings result from being able to reuse the bag as well as being able to seal the film to a simple layer of sealant with no ears or fold as required by the prior art nylon films.

The film of this invention for debulking stretches elastically over a long elongation range, and returns to its original shape with little or no tension set. The preferred film is a thermoplastic polyurethane having a low modulus at 100% extension (preferably, below about 1500 psi) and good elastic properties. The break point should occur above at least about 400% elongation. Economical and durable debulking bags can be made with a film thickness of about 1 to about 1½ of a thousandth of an inch.

Table 1 compares the properties of a polyester based urethane (Film A) and a polyether-based urethane (Film B), each of which can be used in the practice of this invention. The polyester based urethane has the best chemical resistance and may be used in contact with epoxies and other matrix resins up to about 250° F. The polyester backbone makes this film biodegradable. The polyether based urethane film is softer and has a lower modulus. The polyether is attacked by resins such as epoxies above about 100° F. The results under ASTM D638 are for testing a solid bar, as opposed to a film; it is expected that the elongation at break for a film under ASTM D882 would be higher.

TABLE 1

| Preferred Properties Of Debulking Film | | |
|---|---|---|
| | Film A | Film B |
| Tension (ASTM D638) | | |
| Modulus @ 100% elongation (psi) | 1400 | 1000 |
| Modulus @ 300% elongation (psi) | 3500 | 2000 |
| Modulus at break (psi) | 7000 | 7000 |
| Elongation at break (%) | 400% | 450% |
| Durometer Hardness (ASTM D2240) | 95A | 85A |
| Tear Strength (Die C ASTM D624) pli | 550 | 400 |

There are many commercially available thermoplastic urethanes having similar mechanical properties to those shown in the table. Typical properties of thermoplastic polyurethane elastomers are described in B. Walker and C. Rader, "Handbook of Thermoplastic Elastomers," 2d edition, Van Nostran Reinhold, New York, N.Y., pages 251-255 (1988).

While certain preferred embodiments of the invention have hereinbefore been described, it will be appreciated that variations of the invention will be perceived by those skilled in the art. For example, many thermoplastic elastomers similar to the preferred Hytrel compounds will be readily apparent to those skilled in the art which may be made in various thicknesses to withstand various heat and pressure conditions during use. Furthermore, many other types of vacuum bagging configurations, other than the single-sided tool shown herein, can utilize the vacuum bag of this invention. The tool may be contoured, as well as the workpiece. The vacuum bagging operation may be incorporated as part of a continuous, automated production line in which the workpieces travel on conveyors past stations at which the vacuum bags are applied and then loaded into an autoclave. These variations are nevertheless within the scope of the invention as defined by the claims appended hereto.

What is claimed is:

1. A method for forming a workpiece comprising the steps of:

placing the workpiece on an air-tight base;

applying an impervious bag of a thermoplastic elastomer film over the workpiece and base, the film having a thickness of no greater than about 10 thousandths of an inch and a secant modulus of elasticity at 100% elongation of no greater than about 2500 psi at room temperatures; and applying a pressure differential across the film to cause the film to stretch and yield to conform to the workpiece.

2. A method for forming a workpiece comprising the steps of:

placing the workpiece on an air-tight base;

applying an impervious bag of a thermoplastic elastomer film over the workpiece and base;

forming an air-tight seal around the workpiece between the film and base; and applying a pressure differential across the film to cause the film to stretch in a substantially elastic manner up to a yield stress and thereafter yield at substantially the yield stress up to at least about 400% elongation to conform to the workpiece.

3. The method of claim 2, wherein the film stretches elastically to conform to the workpiece at a pressure differential of no greater than about 100 psi.

4. The method of claim 2, wherein the film stretches elastically up to about 100–200% elongation and thereafter yields.

5. The method of claim 2, wherein the film has a thickness of from about two to about five thousandths of an inch and stretches elastically to contact the workpiece at a pressure differential of no greater than about 100 psi.

6. The method of claim 2, adapted for curing at temperatures of up to about 350° F., wherein the film is a polyester/polyether block copolymer having a thickness of no greater than about three thousandths of an inch.

7. The method of claim 2, adapted for curing at of up to about 400° F., wherein the film is a copolyester block copolymer.

8. The method of claim 2, adapted for curing at temperatures of up to about 600° F., wherein the film is a polyimide/siloxane block copolymer.

9. An improved vacuum bagging apparatus comprising:
   a base for supporting a workpiece;
   an impervious bag positionable over the workpiece and attachable to the base; and
   means for applying a pressure differential across the bag causing the bag to exert substantially uniform pressure on the workpiece;
   wherein the bag comprises a thermoplastic elastomer film having a thickness of no greater than about 10 thousandths of an inch and a secant modulus of elasticity at 100% elongation of no greater than about 2500 psi at room temperature, wherein the film stretches and yields to conform to a workpiece when a pressure differential is applied.

10. The apparatus of claim 9, wherein
    the film exhibits a substantially elastic stretch up to a yield stress and thereafter yields at substantially the yield stress up to at least about 400% elongation to conform to the workpiece.

11. The apparatus of claim 9, wherein
    the film is stretchable to contact the workpiece at a pressure differential of no greater than about 100 psi.

12. The apparatus of claim 9, wherein
    the film has a thickness of from about 2 to about 5 thousandths of an inch.

13. The apparatus of claim 9, wherein
    the film has a melt temperature of at least about 400° F. and a Vicat softening temperature of at least about 350° F.

14. The apparatus of claim 9, wherein
    the film is selected from the group consisting of block copolymers or blends of polyester, polyether, polyamide, polyurethane, polyolefin, polystyrene, polyacrylic, polyvinyl, polycarbonate, polyimide, polysiloxane, and mixtures thereof.

15. The apparatus of claim 14, wherein
    the film is a block copolymer (ab) comprising segments a) selected from the group consisting of polyether, polyester, and mixtures thereof, joined by segments b) selected from the group consisting of polyester, polyurethane, polyamide, and mixtures thereof.

16. The apparatus of claim 15, wherein
    the film is a polyester/polyether block copolymer.

17. The apparatus of claim 16, wherein the copolymer has an apparent hardness of from about 40 and about 72 Shore D, according to ASTM D2246.

18. The apparatus of claim 16, wherein
    the film is a copolymer of polytetramethylene ether glycol and terephthalic acid, and butene-1,4-diol and terephthalic acid.

19. The apparatus of claim 16, wherein
    the film further includes an antioxidant to increase the resistance of the film to oxygen in the presence of heat.

20. The apparatus of claim 9, wherein the film comprises a blend of:
    a block copolymer having an apparent hardness of about 55 Shore D, according to ASTM D2240;
    a viscosity modifier to increase the melt viscosity; and
    an antioxidant modifier to increase the resistance of the film to oxygen in the presence of heat.

21. The apparatus of claim 20, wherein
    the viscosity modifier comprises another block copolymer having substantially the same physical properties but which has been modified to increase its melt viscosity.

22. The apparatus of claim 9, wherein the film comprises:
    a polyester/polyester block copolymer.

23. The apparatus of claim 22, wherein the film has a thickness of about 3 thousandths of an inch.

24. The apparatus of claim 9, wherein the film comprises:
    a polyimide/siloxane block copolymer.

25. An improved vacuum bagging apparatus comprising:
    a base for supporting a workpiece;
    an impervious bag positionable over the workpiece and attachable to the base; and
    means for applying a pressure differential across the bag causing the bag to exert substantially uniform pressure on the workpiece;
    wherein the bag comprises a thermoplastic elastomer film which upon application of a pressure differential exhibits a substantially elastic stretch up to a yield stress and thereafter yields at substantially the yield stress up to at least about 400% elongation to conform to the workpiece.

26. A vacuum bagging assembly for forming a workpiece comprising:
    an air-tight base on which a workpiece is placed;
    a stretchable thermoplastic elastomer film as an impervious bag to be laid across the workpiece and held securely to the base, the film having a thickness of no greater than about 10 thousandths of an inch and a secant modulus of elasticity at 100% elongation of no greater than about 2500 psi at room temperature;
    a fastening means to secure and form a continuous air tight seal between the film and the base; and
    a means for applying a pressure differential across the film, wherein the film stretches and yields to conform to the workpiece when a pressure differential is applied.

* * * * *

UNITED STATES PATENT AND TRADEMARK OFFICE
CERTIFICATE OF CORRECTION

PATENT NO. : 5,123,985
DATED : June 23, 1992
INVENTOR(S) : Patricia Evans, et. al.

It is certified that error appears in the above-indentified patent and that said Letters Patent is hereby corrected as shown below:

col. 1, line 32, change "o" to --of--
col. 2, line 61, change "A-heat." to --A heat-- col. 3, line 37, change "found large" to --found. A large--
col. 12, line 66, change "Arnol" to --Arnold, C.A.--
col. 12, line 67, change "T and" to --T.C. Ward, and--
col. 15, line 14, after "at" add --temperatures--

Signed and Sealed this

Twenty-fourth Day of August, 1993

Attest:

BRUCE LEHMAN

*Attesting Officer*   *Commissioner of Patents and Trademarks*